United States Patent Office 3,245,918
Patented Apr. 12, 1966

3,245,918
BEAD PROCESS AND PRODUCTS
Alfred J. Burzynski, Toledo, Ohio, assignor to Owens-Illinois Glass Company, a corporation of Ohio
No Drawing. Filed June 12, 1963, Ser. No. 287,202
10 Claims. (Cl. 252—448)

The present invention relates to a method for preparing silica beads. In particular, this invention relates to a process for preparing silica beads, essentially free of organic material, from alkyl orthosilicates.

Silica beads have found application as catalysts or catalyst supports in fixed, moving or fluidized bed systems for hydrocarbon conversion processes in the petroleum industry. Consequently, methods have been provided for preparing beads by condensation of silanols or alkali metal silicates. Aqueous solutions which contain mixtures of the sodium salts of silicic acid and its condensation products, the polysilicic acids, are commonly referred to as "sodium silicate" solutions. A widely used, commercially available sodium silicate solution, for example, contains about 40% $Na_2Si_3O_7$. These salts can be converted to the corresponding silanols by acidification, and they are ordinarily the precursors of choice because of their relatively low cost. As applied to sodium silicate precursors, the process usually involves preparation of a suspension of acidified aqueous sodium silicate in a water-immiscible medium such as a hydrocarbon; the resultant suspension is maintained until the spheres have hardened, and they are then separated from the medium, sorted, and washed free of undesirable contaminants. The water-immiscible organic media must be removed by repeated washing, usually with organic solvents, or they must be burned off. The cost of removing these reagents from the product beads and the time consumed in their removal represent, of course, an increase in the cost of the bead forming process. In many applications of the beads as catalysts or catalyst supports, however, it is important to remove all organic material, since it may retard catalytic activity.

Recently processes have been discovered for the preparation of silica beads from organosiloxane precursors by hydrolysis to the corresponding silanols, and subsequent condensation of the silanols to organopolysiloxanes. In order to obtain beads rather than irregularly shaped gels, it is necessary either to use an immiscible organic medium in a manner similar to that described for sodium silicate bead processes, or to add an emulsifier to the reaction mixture. In the latter process, the emulsifying agent evidently allows the incipient gel to form relatively small, essentially spherical particles, which are then allowed to harden. The resultant organopolysiloxane beads can be converted to silica beads by firing at temperatures above about 600° C., preferably about 1000° C. The initial presence of carbon in the beads is shown by their blackening as they are first heated; if the elevated temperature is maintained, they eventually lose their carbon content.

It is therefore an object of the present invention to provide a method for preparing substantially spherical silica beads of relatively uniform, small size, which are essentially free of organic materials.

It is another object of this invention to provide a method for forming small, essentially spherical silica beads by means which do not require either an immiscible organic medium or an emulsifying agent during bead formation.

It is a further object of this invention to provide a process for the preparation of small, essentially spherical silica beads which are substantially free from organic impurities by means which do not require extensive purification of the beads after their synthesis.

According to the present invention, a reaction mixture which comprises a compound of the formula

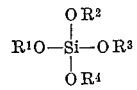

wherein each of $R^1$, $R^2$, $R^3$, and $R^4$ independently represents an alkyl radical which contains less than five carbon atoms; water; and acid is agitated to produce silica beads.

The alkyl orthosilicate precursors of the formula

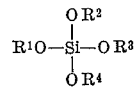

as defined above include methyl orthosilicate, ethyl orthosilicate, n-propyl orthosilicate, isopropyl orthosilicate, n-butyl orthosilicate, sec-butyl orthosilicate, isobutyl orthosilicate, t-butyl orthosilicate, methyl triethyl orthosilicate, dimethyl diethyl orthosilicate, methyl diethyl n-propyl orthosilicate, diethyl di-sec-butyl orthosilicate, and dimethyl di-t-butyl orthosilicate.

In the practice of the present invention, usually a mixture which comprises an alkyl orthosilicate as defined above and aqueous acid of pH from about 2 to 6.9 is stirred and heated at a temperature in the range from room temperature to reflux temperature at the prevailing pressure, usually not above 200° C., to produce silica beads which are essentially free of organic matter.

In a preferred embodiment of the present invention, a mixture which comprises an alkyl orthosilicate as defined above and aqueous acid of pH from about 5 to about 6.9 is stirred and heated at a temperature in the range from about 50° C. to about 95° C. at a pressure of about one atmosphere to produce relatively uniform, small silica beads which are essentially free of organic impurities.

The quantities of alkyl orthosilicate and water used are not critical, except that there must be sufficient water to carry out the initial hydrolysis. This effective lower limit can be set by considering the hydrolysis and condensation reactions as:

$$n(RO)_4Si + 4nH_2O = n(HO)_4Si + 4nROH$$

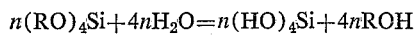
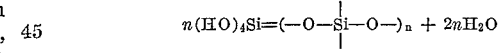

From these equations, the quantity of water used up in the overall reaction is that required for the initial hydrolysis ($4nH_2O$) minus that formed during subsequent condensation ($2nH_2O$) or $2nH_2O$, where $n$ is the moles of alkyl orthosilicate initially present. There is no upper limit to the quantity of water which can be used other than that determined by convenience.

The acid used to make the reaction mixture acidic can be an inorganic acid such as hydrochloric acid, nitric acid, sulfuric acid or hydrobromic acid, or an organic acid such as formic acid, acetic acid, propionic acid, oxalic acid, succinic acid, benzoic acid or phthalic acid. Beyond the cited pH limitations, irregular gel formation rather than bead formation takes place; this is further illustrated in the examples below.

The temperature used is not generally critical, since at ordinary temperatures it determines the rate but not the course of the reaction. Increased temperature increases the rate of reaction, and it is usually convenient to carry out the bead forming process at temperatures which allow gentle reflux in closed or condenser-equipped vessels, or at a gentle boil in open containers. The boiling or reflux temperature will depend primarily upon the concentration and molecular weight of the alkanol produced in the hydrolysis reaction; higher alkanols increase the boiling point of the mixture more than their lower homologs at the same concentration. Since pressure usually does not affect the bead forming process of this invention, it is convenient to carry out the reactions at ambient pressure, and to use temperatures as previously described but not usually above 200° C.

Although it is necessary that the reaction mixture be subjected to agitation during hydrolysis and condensation, no particular means of agitation are required. It is convenient to provide a shaker or stirrer, and it is usually found that increased rate of agitation results in decreased size of the product beads. In general the product beads are about 1 micron to about 1.5 millimeters in diameter. The time required to complete the bead formation is dependent on the particular alkyl orthosilicate used, the concentration of acid, and the temperature, but is usually less than two hours.

The process of this invention can be carried out in an open or closed system, and in a discontinuous or continuous manner. For example, the reaction can be carried out in a discontinuous manner by using a beaker as the reaction vessel, and removing the resultant product by filtration. The bead forming process can be made continuous merely by supplying means which filter the reaction mixture and return the filtrate to the reaction vessel, and by adding the alkyl orthosilicate in a constant stream to the reaction vessel.

Although the mechanism by which the process of the present invention results in bead formation is not known, the following explanation is suggested. The acidification of an aqueous solution or suspension of an alkyl orthosilicate ordinarily results in the formation of a relatively large, irregularly shaped silica gel, by hydrolysis and condensation processes represented by the equations given above. If the reaction mixture is stirred rapidly during condensation, intramolecular condensation is favored over intermolecular condensation, and the limiting result is bead formation.

The silica beads provided by this invention can be used as catalysts or catalyst supports; as refractory fillers in plastics; as dessicants and adsorbents; and as pigments or pigment carriers in oil or water soluble paints.

The following examples are intended to illustrate, but not to limit, the invention.

*Example 1*

A. In a 100-ml. beaker were placed 44 grams (0.2 mole) of ethyl orthosilicate, 14 grams (0.8 mole) of distilled water, and two drops of 1 molar hydrochloric acid; the pH was about 5.3. The mixture thus obtained was heated with stirring to 80 to 85° C., whereupon evolution of alcohol was noted. The resultant mixture was held in the cited temperature range for about fifteen minutes, and beads began to form. After an additional fifteen minutes the reaction mixture was subjected to filtration, washed with water, and air dried. The silica beads thus obtained were clear and uniformly spherical, and had a size range of from about 1 micron to about 1.5 millimeters in diameter. A sample of the beads thus obtained was heated to 300° C., and no charring or cracking was noted, indicating the absence of organic matter.

B. The procedure of Example 1A was repeated in three further experiments, except that the pH was altered to 0.3, 0.7, and 1.4. The first two experiments gave no beads; the experiment at pH 1.4 gave beads of irregular shape and poor quality. The lower practical limit of pH for good bead formation is therefore believed to be about 2.

*Example 2*

A. The procedure of Example 1A was repeated, but two drops of 6 molar hydrochloric acid was used instead of the two drops of 1 molar hydrochloric acid therein described; the pH of the reaction mixture was about 5. The reaction mixture thus obtained was treated as in the cited example, and the product beads were of similar quality.

B. The procedure of Example 1A was repeated, except that twice the quantities of all reagents therein described was used. After beads had formed, water was added to restore the volume of the reaction mixture to its original value, and a second crop of beads was subsequently obtained.

C. By the procedure of Example 1A, a mixture of 64 grams (0.2 mole) of n-butyl orthosilicate, 14 grams (0.8 mole) of distilled water, and two drops of 1 molar nitric acid is prepared and subsequently treated as therein described to give clear silica beads, essentially free of organic impurities.

D. Substitution of 52 grams of diethyl di-sec-butyl orthosilicate for the ethyl orthosilicate of Example 1A gives, by the procedure therein described, clear silica beads, about 1 micron to 1.5 millimeters in diameter.

It will be apparent to those skilled in the art that modifications can be made in the foregoing disclosure without departing from its spirit or scope, or from the scope of the following claims.

I claim:

1. A process for producing beads which comprises agitating a mixture which comprises a compound of the formula

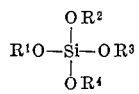

wherein each of $R^1$, $R^2$, $R^3$, and $R^4$ independently represents an alkyl radical which contains less than five carbon atoms; water; and acid at a pH of 2 to 6.9 until beads have formed dispersed in the liquid remaining.

2. A process for producing beads which comprises agitating a mixture which comprises ethyl orthosilicate, water, and acid at a pH of 2–6.9 until the beads have formed dispersed in the liquid remaining.

3. A process for producing beads which comprises agitating a mixture which comprises a compound of the formula

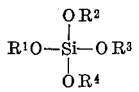

wherein each of $R^1$, $R^2$, $R^3$, and $R^4$ independently represents an alkyl radical which contains less than five carbon atoms; water; and acid at a pH of from 2 to 6.9 and a temperature of from 20° C. to 200° C. for a time of up to two hours until said beads have formed dispersed in the liquid remining.

4. A process for producing beads which comprises agitating a mixture which comprises ethyl orthosilicate, water, and acid at a pH of from 2 to 6.9 and a temperature of from 20° C. to 200° C. for a time of up to two hours until said beads have formed dispersed in the liquid remaining.

5. A process for producing beads which comprises agitating a mixture which comprises n-propyl orthosilicate, water, and acid at a pH of from 2 to 6.9 and a temperature of from 20° C. to 200° C. for a time of up to two hours until said beads have formed dispersed in the liquid remaining.

6. A process for producing beads which comprises agitating a mixture which comprises n-butyl orthosilicate, water, and acid at a pH of from 2 to 6.9 and a temperature of from 20° C. to 200° C. for a time of up to two hours until said beads have formed dispersed in the liquid remaining.

7. A process for producing beads which comprises agitating a mixture which comprises a compound of the formula

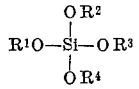

wherein each of $R^1$, $R^2$, $R^3$, and $R^4$ independently represents an alkyl radical which contains less than five carbon atoms; water, and acid at a pH of from 5 to 6.9, a temperature of from 50° C. to 95° C., and a pressure of about one atmosphere for a time of up to two hours until said beads have formed dispersed in the liquid remaining.

8. A process for producing beads which comprises agitating a mixture which comprises ethyl orthosilicate, water, and acid at a pH of from 5 to 6.9, a temperature of from 50° C. to 95° C., and a pressure of about one atmosphere for a time of up to two hours until said beads have formed dispersed in the liquid remaining.

9. A process for producing beads which comprises agitating a mixture which comprises n-propyl orthosilicate, water, and acid at a pH of from 5 to 6.9, a temperature of from 50° C. to 95° C., and a pressure of about one atmosphere for a time of up to two hours until said beads have formed dispersed in the liquid remaining.

10. A process for producing beads which comprises agitating a mixture which comprises n-butyl orthosilicate, water, and acid at a pH of from 5 to 6.9, a temperature of from 50° C. to 95° C., and a pressure of about one atmosphere for a time of up to two hours until said beads have formed dispersed in the liquid remaining.

References Cited by the Examiner

UNITED STATES PATENTS

| | | | |
|---|---|---|---|
| 2,317,803 | 4/1943 | Reeves et al. | 252—451 X |
| 2,419,272 | 4/1947 | Marisic et al. | 252—451 X |

BENJAMIN HENKIN, *Primary Examiner.*

MAURICE A. BRINDISI, *Examiner.*

H. S. MILLER, *Assistant Examiner.*